United States Patent [19]

Katzin

[11] Patent Number: 5,794,972
[45] Date of Patent: Aug. 18, 1998

[54] ACTIVELY OVERRIDABLE PASSENGER CONSTRAINT SYSTEM

[76] Inventor: Lawrence F. Katzin, 324 Westridge Dr., Raleigh, N.C. 27609

[21] Appl. No.: 694,208

[22] Filed: Aug. 8, 1996

[51] Int. Cl.[6] .................................................. B60R 21/32
[52] U.S. Cl. .................................... 280/735; 180/268
[58] Field of Search ..................... 280/735, 730.1; 180/268

[56] References Cited

U.S. PATENT DOCUMENTS

| | | | |
|---|---|---|---|
| 3,672,699 | 6/1972 | De Windt | 280/735 |
| 5,071,160 | 12/1991 | White et al. | 280/735 |
| 5,074,583 | 12/1991 | Fujita et al. | 280/735 |
| 5,161,820 | 11/1992 | Vollmer | 280/735 |
| 5,330,226 | 7/1994 | Gentry et al. | 280/735 |
| 5,482,314 | 1/1996 | Corrado et al. | 280/735 |
| 5,497,327 | 3/1996 | Takaya et al. | 280/735 |
| 5,570,903 | 11/1996 | Meister et al. | 280/735 |

*Primary Examiner*—Kenneth R. Rice
*Attorney, Agent, or Firm*—Nathan Wolf

[57] ABSTRACT

A controlling passenger is provided with an actively overridable system for enabling and disabling selected air bags. The system further includes visual feedback of the current operational status of the respective air bags. The visual feedback is displayed in a spatial pattern that replicates the spatial positioning of the individual air bag locations within the vehicle.

16 Claims, 4 Drawing Sheets

ACTIVELY OVERRIDABLE PASSENGER CONSTRAINT SYSTEM

FIELD OF INVENTION

This invention relates generally to passenger constraint systems found in passenger vehicles and more particularly to inflatable air bag systems commonly found for use.

BACKGROUND OF THE INVENTION

Inflatable air bag systems for use in passenger vehicles are well known. In the vast majority of crashes where air bags have been deployed they have served to reduce the number and severity of injuries. However, in a significant number of cases the inflation of an air bag, has caused injury and death. The most likely to be harmed by rapidly inflating air bags are the small, weak and frail, particularly infants, small children and the elderly.

Additionally, if a crash occurs and there are no passengers to be protected at some air bag locations, the deployment of those air bags is wasted. Replacement costs are high, costing hundreds if not thousands of dollars, prompting some vehicle owners to indiscrimanently disable the air bag systems. Others have refused to replace air bags after a crash.

Various attempts have been made to provide air bag systems which overcome these problems: increased risk of injury and death to certain class of passengers; and unnecessary replacement.

U.S. Pat. No. 3,672,699 discloses a system having sensors within the seats to detect presence of an occupant. A control mechanism in conjunction with the occupant sensor automatically activates the associated air bag when the seat is occupied. If the seat is not occupied, the air bag is passively disabled.

U.S. Pat. No. 5,071,160 discloses a system that uses multiple types of sensors to detect the presence as well as the condition of occupants at various locations within the vehicle. Conditions detected are weight and relative position. Using a control module along with these detectors, the air bag system response is automatically varied to reflect passenger conditions. A signal indicator alerts the passenger when he has assumed a position that lessens the effectiveness of the restraint.

U.S. Pat. No. 5,074,583 discloses an air bag system having sensors which, among other things, measures seat position, reclining angle, passenger size and posture. A control unit automatically determines optimum inflation in a crash in accordance with the collected measurements.

U.S. Pat. No. 5,330,226 discloses an air bag system having a dashboard mounted sensor and an overhead sensor to determine passenger animation. A control unit, utilizing these sensor inputs, automatically determines the optimum air bag inflation in the event of a crash.

None of these ingenious and complex inventions have yet been widely accepted. It is speculated that the resistance to implementing these aforementioned inventions is due to the passive nature of the control as well as cost. An actively overridable system that introduces little additional cost, is easy and unambiguous to invoke, and presents an easy and unambiguous feedback system should be more widely accepted.

SUMMARY OF THE INVENTION

Accordingly, it is the object of the present invention to provide to a controlling passenger, such as the driver, an actively overridable means of disabling and enabling selected air bags and to provide a visual feedback of the current operative status for each air bag. The visual feedback means would be displayed in a spatial pattern that replicates the spatial positioning of the individual air bag locations within the passenger vehicle, thus allowing the controlling passenger to check the status at a single, quick glance.

Another object of the present invention is to position the override controls in a spatial pattern replicating the spatial positioning of the individual air bag locations such that the controlling passenger can rapidly and with minimal confusion select the appropriate override control.

Yet another object is to provide an audible alarm whenever the override status for any of the air bags is actively changed.

Another objective is to require that the controlling passenger actively disable selected air bags after the vehicle has been first powered on; the default status for all air bags would be in the enabled state.

Another object of the present invention is to allow a controlling passenger a means of programming the default state of each air bag when the vehicle is first powered on.

It is still another object to adapt the aforementioned objects to a system that includes a passive disabling air bag system using sensing means that detects when there are no passengers present at an air bag location.

It is yet another object to adapt this invention to a system that includes passenger sensing devices which detect both the presence and condition of passengers at an air bag location so as to automatically control the inflation speed, pattern and volume of each air bag as well as the enablement of the air bags.

These and other objects, features and advantages will appear from the descriptions which follow.

BRIEF DESCRIPTION OF THE DRAWINGS

FIG. 4 is a schematic showing the spatial positioning of visual feedback indicator means such that an indicator used to report the status of a specific air bag is in the same relative position as the air bag it is providing feedback on.

DETAILED DESCRIPTION OF THE EMBODIMENTS

While the present invention will be described more fully hereinafter, it is to be understood that persons of skill in the art may modify the invention herein described while still achieving the favorable results of this invention. Accordingly, the description which follows is to be understood as being a broad teaching disclosure directed to persons of skill in the appropriate arts, and not as limiting upon the present invention.

Figure 1:
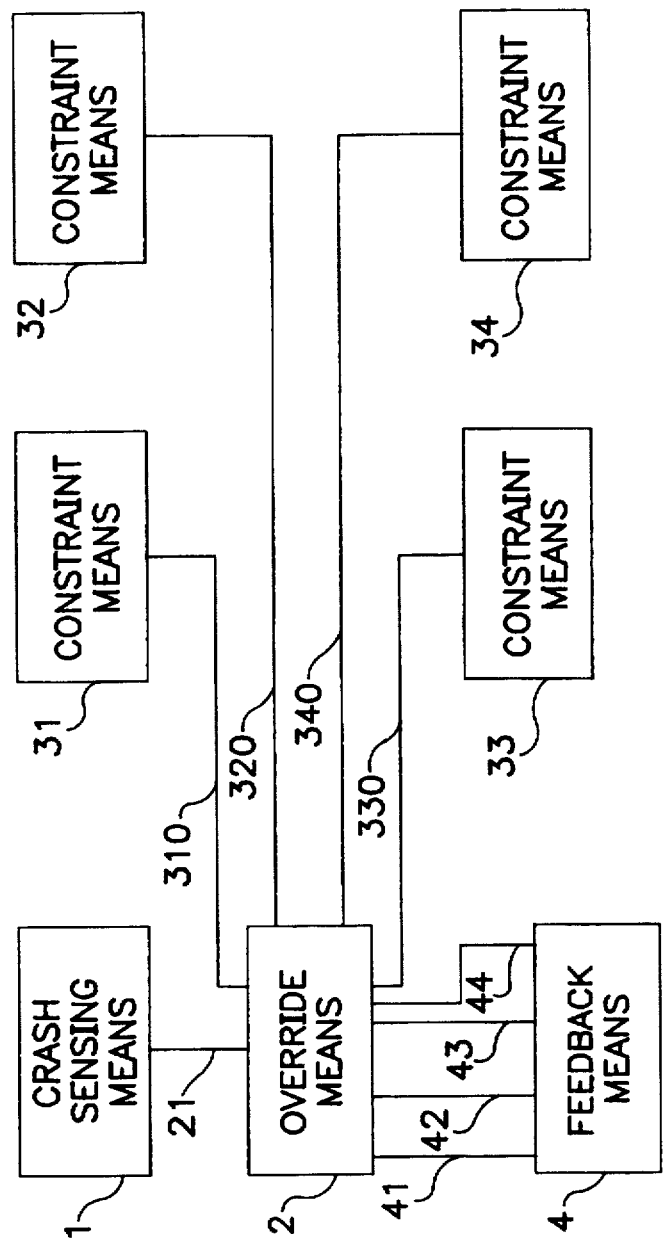
FIG. 1 is a block diagram of the actively overridable constraint system showing the relationship of the elements of this invention.

The actively overridable constraint system first embodiment as represented in FIG. 1 has a crash sensing means 1 which detects when the vehicle is in a collision exceeding a predetermined level, that is, a crash. This detection can be accomplished by using commercially available sensors, typically an accelerometer.

At least one constraint means is included in the system. FIG. 1 depicts four constraint means (31, 32, 33 and 34) in this configuration. A single constraint means comprising a commercially available air bag (not illustrated) mounted within the vehicle in a folded, deflated condition and an inflating means (not illustrated), also readily available commercially, for rapidly inflating said air bag and thus cushioning and protecting any passengers located proximate to said air bag in the event of a crash.

Figure 3:
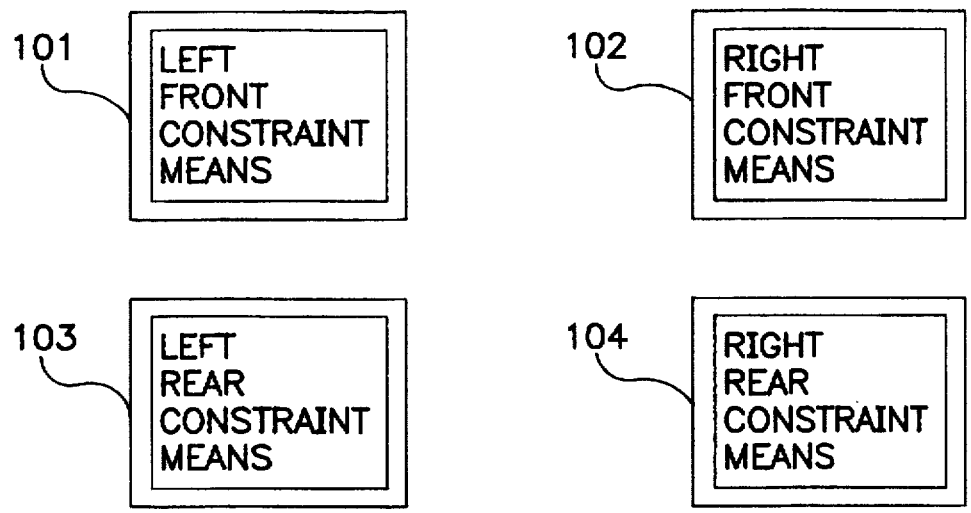
FIG. 3 is a schematic showing a typical spatial positioning of air bags within a vehicle.

FIG. 3 is a schematic of the physical positioning of an hypothetical set of four constraint means (101, 102, 103, 104) within a passenger vehicle. Constraint means 101 is proximate the left front passenger (i.e., the driver in the U.S.); 102 is proximate the right front passenger; 103 is proximate the rear left passenger; 104 is proximate the right rear passenger.

The override means 2, in circuit 21 with the crash sensing means 1 and in parallel circuits (310, 320, 330, 340) with respective individual constraint means (31, 32, 33, 34), allows a controlling passenger, typically the driver, to actively change the operative status of any of the constraint means. The term "operative status" is used here to indicate the deployment status of a constraint means, that is whether it is enabled or disabled. The override means, for this embodiment, comprising four individual control switches (not illustrated). There is one switch dedicated to a specific constraint means. The controlling passenger can toggle between a disabled and an enabled state for a given constraint means by alternately opening and closing the control switch for that constraint means.

A feedback means 4, connected in parallel circuits (41, 42, 43, 44) with the override means, comprising a plurality of visual indicator means (not illustrated) for reporting the operative status, that is disabled or enabled, of each constraint means.

These indicator means are, for this embodiment, a pair of LED's of contrasting colors such as red and green. If a constraint means has been disabled, the indicator means associated with that constraint means will have the red LED lit. If a constraint means is enabled, the green LED will be lit. As the controlling passenger toggles the control switch for a given constraint means (for example, the driver disables constraint means 32) the change in status is detected by the feedback means via one of the circuits connecting to the override means. (In this example, circuit 42 will serve to alert the feedback means that constraint means 32 status has been changed to a disabled status.) The appropriate LED is lit and the companion green LED is extinguished.

Each indicator means serves to provide feedback of the status of a specific constraint means. Each indicator means is positioned in a spatial pattern that replicates the spatial positioning of the individual constraint means.

Figure 4:
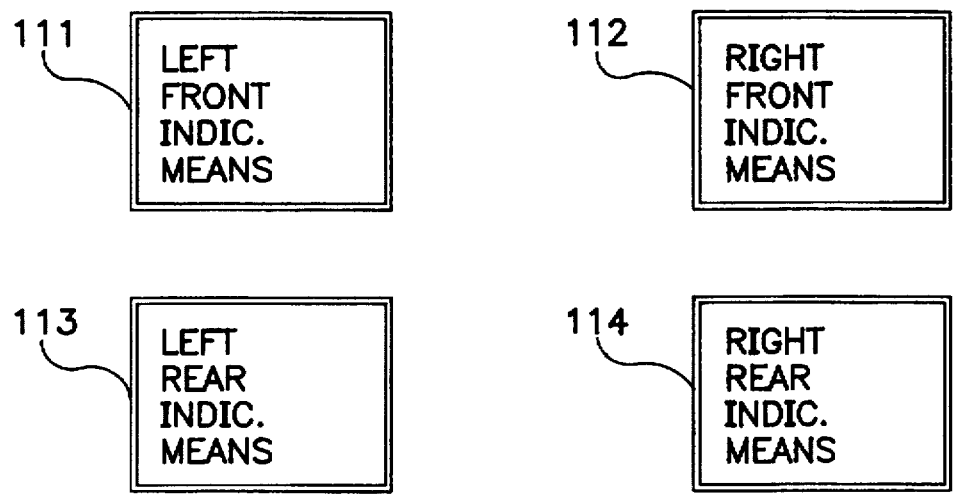

FIG. 4 is a schematic of the physical positioning of an hypothetical set of four indicator means (111, 112, 113, 114). Indicator means 111 provides feedback for FIG. 3 constraint means 101; indicator means 112 provides constraint means 102 feedback; indicator means 113 provides constraint means 103 feedback; and indicator means 114 provides constraint means 104 feedback. Thus, the controlling passenger, can, at a glance, readily and unambiguously determine the operative status of each constraint means.

If a crash occurs, an activation signal is generated by the crash sensing means. The activation signal is transmitted via circuit 21 to the override means 2. The activation signal is then transmitted to each of the constraint means whose operative status is enabled. The inflating means detects the activation signal and inflates the air bag. The air bag rapidly projects into the passenger compartment thus cushioning and protecting any passengers located proximate to said air bag.

However, if the controlling passenger has actively changed the operative status of a constraint means to disabled, the air bag for that constraint means is not deployed. For example if the control switch for constraint means 32 is opened, circuit 320 is opened, and the activation signal is prevented from reaching constraint means 32, thus disabling it.

Figure 5:
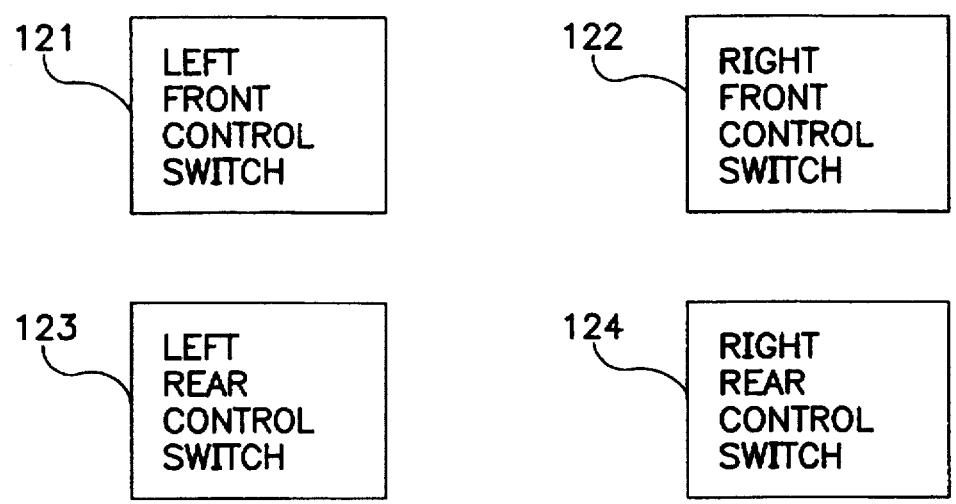
FIG. 5 is a schematic showing the spatial positioning of the override control switches such that a control switch to a specific air bag is in the same relative position as is the air bag it is controlling.

An additional feature of this invention spatially positions the control switches so as to replicate the spatial positioning of the constraint means. FIG. 5 is a schematic of the physical positioning of an hypothetical set of four control switches (121, 122, 123, 124). Control switch 121 allows the controlling passenger to actively select the operative status for FIG. 3 constraint means 101. Similarly, control switch 122 controls the operative status of constraint means 102; control switch 123 controls the operative status of constraint means 103; and control switch 124 controls the operative status of constraint means 104.

An additional feature of this invention would provide for a brief, such as five second, audible alarm means (not illustrated) to be sounded whenever the operative status for any constraint means was changed. The controlling passenger would be alerted to some change in the constraint means status. He/she could quickly glance at the indicator means display to note which air bags were disabled and which were enabled. The spatially arranged display would allow quick and unambiguous feedback as to the status of all the constraint means.

Another feature of this invention would have the initial operative status for all the constraint means set to enabled when the vehicle was first powered on. The controlling passenger would have to actively disable any constraint means as required.

Still another feature of this invention would have the initial operative status for the constraint means programmed to specific operative statuses when the vehicle was first powered on. The controlling passenger would have to actively modify any constraint means operative status as required.

Figure 2:
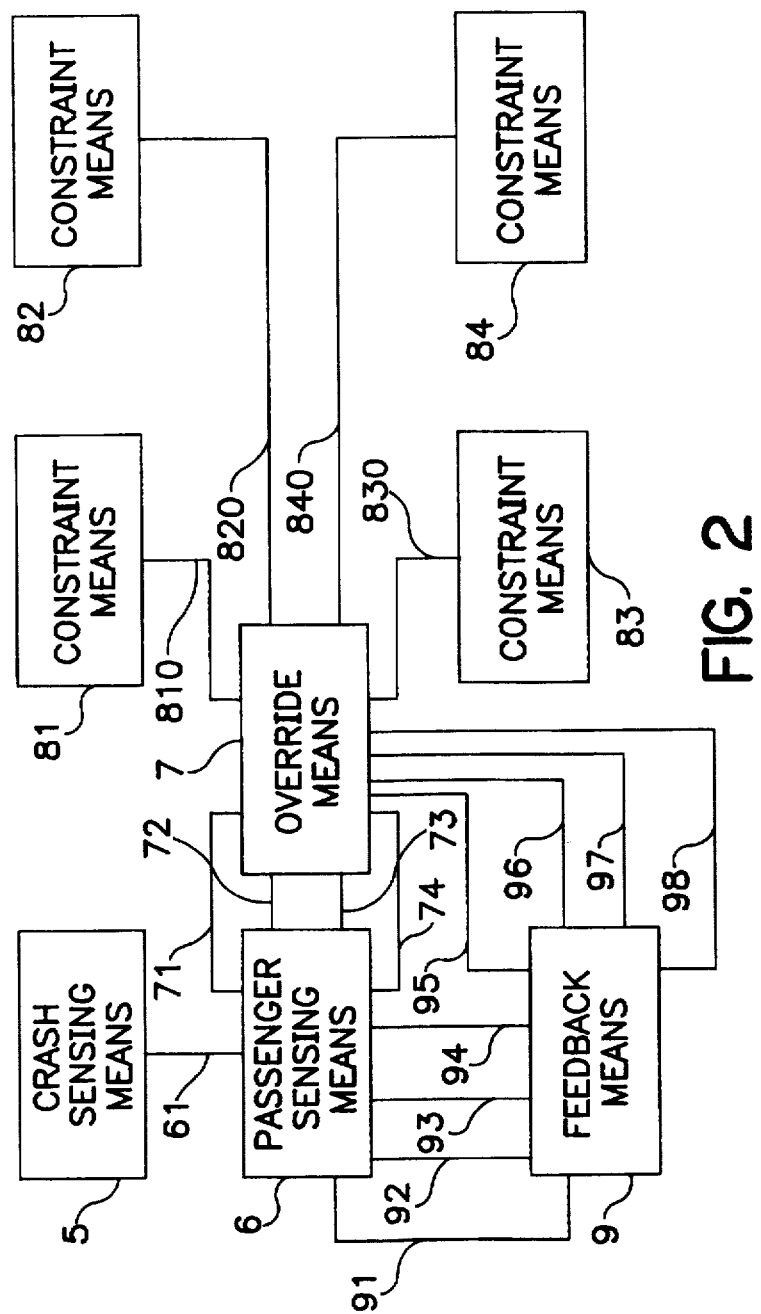
FIG. 2 is a block diagram of the relationship of the elements of this invention where a passenger sensing means is included as part of the system.

The actively overridable constraint system second embodiment as represented in FIG. 2 introduces a passenger sensing means into the system resulting in a different embodiment from the one described above. Crash sensing means 5 is in circuit 61 with passenger sensing means 6. The passenger sensing means uses sets of detectors (not illustrated) such as infrared sensors installed in the vehicle's headliner and switches imbedded in the passenger seats which are closed by weight. There would be a set of detectors for each constraint means to be passively controlled. The passenger sensing means, upon detection of the absence of passengers at a specific location would disable the constraint means proximate that location by breaking the specific circuit (71, 72, 73 or 74) associated with the constraint means to be disabled.

The override means 7, in parallel circuits 71, 72, 73 and 74 with the passenger sensing means 6 and is parallel circuits (810, 820, 830, 840) with respective individual constraint means (81, 82, 83, 84), allows a controlling passenger, typically the driver, to actively change the operative status of any of the constraint means. Circuits 71 and 810 are in series. Similarly, circuits 72 and 820 are in series; circuits 73 and 830 are in series; and circuits 74 and 840 are in series. Thus if either circuit 72 or 820 is opened, the associated constraint means 82 will be disabled. This embodiment does not permit the controlling passenger to actively enable a specific constraint means where the passenger sensing means has passively disabled that constraint means.

The override means comprising four control switches (not illustrated). Each of these switches control specific constraint means and are spatially positioned as described previously in the first embodiment.

Feedback means 9 is in parallel circuits 91, 92, 93 and 94 with the passenger sensing means and is connected in parallel circuits 95, 96, 97, and 98 with the override means, comprising a plurality of visual indicator means (not illustrated) for reporting the operative status, that is disabled or enabled, of each constraint means.

These indicator means are, for this embodiment, a pair of LED's of contrasting colors such as red and green. If a constraint means has been disabled by either the passive passenger sensing means or by the active override means, the indicator means associated with that constraint means will have the red LED lit. The disabled LED is controlled by an OR gate. If either the passenger sensing means or the override means would disable a specific constraint means, the indicator means for that constraint means will provide a feedback of disabled. If a constraint means is enabled, the green LED will be lit.

If the passenger sensing means has not disabled a specific constraint means, as the controlling passenger toggles the control switch for that constraint means (for example, the driver disables constraint means 82) the change in status is detected by the feedback means via one of the circuits connecting to the override means. (In this example, circuit 96 will serve to alert the feedback means that constraint means 82 status has been changed to a disabled status.) The appropriate LED is lit and the companion green LED is extinguished.

The indicator means are spatially positioned as previously described in the first embodiment.

The three additional features of the first embodiment: an audible alarm to signal an active change in the operative status; a default initial power on status of enabled; and the ability to program the initial power on status remain unchanged for this embodiment.

A third embodiment, also represented by FIG. 2, introduces a passenger sensing means into the system that detects not only the presence or absence of passengers at specific seating locations proximate to specific constraint means. Passenger conditions such as size, animation, posture, and seat angle are detected. These data are used to automatically calculate the ideal inflation speed, pattern and volume of air bags of specific constraint means.

The passenger sensing means is adapted to modify the activation signal so as to reflect the optimal inflation pattern. Further, the inflating means is adapted to recognize differences in activation signal levels and is further adapted to control the inflation speed, pattern and volume of said air bag based on a modified activation signal.

An additional feature of the third embodiment would be to adapt the override means to generate modified activation signals, provided that the passenger sensing means did not disable the activation signal. The controlling passenger would use a control switch, previously described, to select override control. The controlling passenger would then be allowed to select the level of signal to be transmitted to the selected constraint means. This would be done with a rheostat device, one rheostat device for each of the that controlling means.

If override control was selected, the controlling passenger would adjust the rheostat control to the level desired for that constrain means. Upon receipt of an activation signal of any amplitude, the override means would generate its own activation signal with amplitude adjusted to the level established by the controlling passenger. This modified activation signal would be transmitted to the selected constraint means.

In all other respects, the third embodiment is the same as the second embodiment described previously.

What is claimed is:

1. An actively overridable passenger constraint system for a vehicle comprising:
   a crash sensing means for sensing when the vehicle is in a collision that exceeds a predetermined impact level, the crash sensing means being adapted to output an activation signal upon the occurrence of a collision exceeding said predetermined impact level;
   at least one constraint means for constraining passengers when said activation signal is received, a single constraint means comprising an air bag mounted within the vehicle in a folded, deflated condition and an inflating means for rapidly inflating said air bag and thus cushioning and protecting any passengers located proximate to said air bag;
   an override means, connected in parallel circuits between the crash sensing means and each constraint means, for selectively disabling selected ones of said constraint means, thus placing selected constraint means in a disabled status; and
   a feedback means connected in circuit with the override means comprising a plurality of visual indicator means for reporting the operative status of each constraint means, said indicator means positioned in a spatial pattern that replicates the spatial positioning of the individual constraint means locations;
   whereby a rapid, visual inspection of the indicator means results in an unambiguous, spatially related feedback of each constraint means status.

2. An actively overridable passenger constraint system for a vehicle according to claim 1
   wherein the override means further includes a plurality of control switches, a single switch in circuit with a single constraint means, for active modification of the operative status of any of the constraint means, said control switches positioned in a spatial pattern that replicates spatial positioning of the individual constraint means locations;
   whereby a controlling passenger can actively, rapidly, unambiguously, and easily modify the operative status of a selected constraint means by toggling a unique control switch, selection of control switch corresponding to the control switch's spatial position relative to the selected constraint means spatial positioning within the passenger vehicle.

3. An actively overridable passenger constraint system for a vehicle according to claim 1
   wherein the feedback means further includes an audible alarm means connected in circuit with the override means, for audibly signaling operative status changes;
   whereby said alarm means sounds for a brief, predetermined length of time whenever the operative status of any constraint means is changed.

4. An actively overridable passenger constraint system for a vehicle according to claim 1
   wherein the override means is not deployed when the vehicle is first powered on and a controlling passenger must actively actuate said override means to disable selected ones of the constraint means.

5. An actively overridable passenger constraint system for a vehicle according to claim 1
   wherein the override means deployment when the vehicle is first powered on is programmable.

6. An actively overridable passenger constraint system for a vehicle according to claim 1, further including
   at least one passenger sensing means for sensing the presence of passengers proximate to certain ones of said air bags, each passenger sensing means connected in circuit with the crash sensing means; and
   wherein said override means is further connected in separate circuits with said passenger sensing means and with the corresponding individual constraint means for selectively disabling selected ones of constraint means; and
   wherein said feedback means is further connected in separate circuits with said passenger sensing means;
   whereby a rapid, visual inspection of the indicator means results in an unambiguous, spatially related feedback of each constraint means' status whether a constraint means is passively disabled by the passenger sensing means, is actively disabled by a controlling passenger using the override means, or is enabled.

7. An actively overridable passenger constraint system for a vehicle according to claim 6
   wherein the override means further includes a plurality of control switches, a single switch in circuit with a single constraint means, for active modification of the operative status of any of the constraint means, said control switches positioned in a spatial pattern that replicates spatial positioning of the individual constraint means locations;
   whereby a controlling passenger can actively, rapidly, unambiguously, and easily modify the operative status of a selected constraint means by toggling a unique control switch, selection of control switch corresponding to the control switch's spatial position relative to the selected constraint means spatial positioning within the passenger vehicle.

8. An actively overridable passenger constraint system for a vehicle according to claim 6
   wherein the feedback means further includes an audible alarm means connected in circuit with the override means, for audibly signaling active operative status changes,
   whereby said alarm means sounds for a brief, predetermined length of time whenever the operative status of any constraint means is changed.

9. An actively overridable passenger constraint system for a vehicle according to claim 6
   wherein the override means is not deployed when the vehicle is first powered on and a controlling passenger must actively actuate said override means to disable selected ones of the constraint means.

10. An actively overridable passenger constraint system for a vehicle according to claim 6
    wherein the override means deployment when the vehicle is first powered on is programmable.

11. An actively overridable passenger constraint system for a vehicle according to claim 6,
    wherein the passenger sensing means is further adapted to sense the conditions of passengers proximate to certain ones of said air bags such that the activation signal for a constraint means is disabled if no passengers are detected proximate to that constraint means' air bag, and such that the activation signal for each constraint means is modified by the passenger sensing means reflecting passenger conditions; and
    wherein said inflating means is further adapted to detect modifications in the activation signal and to control the inflation speed, pattern and volume of said air bag based on the modified activation signal.

12. An actively overridable passenger constraint system for a vehicle according to claim 11
    wherein the override means further includes a plurality of control switches, a single switch in circuit with a single constraint means, for active modification of the operative status of any of the constraint means, said control switches positioned in a spatial pattern that replicates spatial positioning of the individual constraint means locations;
    whereby a controlling passenger can actively, rapidly, unambiguously, and easily modify the operative status of a selected constraint means by toggling a unique control switch, selection of control switch corresponding to the control switch's spatial position relative to the selected constraint means spatial positioning within the passenger vehicle.

13. An actively overridable passenger constraint system for a vehicle according to claim 11
    wherein the feedback means further includes an audible alarm means connected in circuit with the override means, for audibly signaling active operative status changes,
    whereby said alarm means sounds for a brief, predetermined length of time whenever the operative status of any constraint means is changed.

14. An actively overridable passenger constraint system for a vehicle according to claim 11
    wherein the override means is not deployed when the vehicle is first powered on and a controlling passenger must actively actuate said override means to disable selected ones of the constraint means.

15. An actively overridable passenger constraint system for a vehicle according to claim 11
    wherein the override means deployment when the vehicle is first powered on is programmable.

16. An actively overridable passenger constraint system for a vehicle according to claim 11
    wherein the override means is further adapted for modifying the activation signal to be sent to selected constraint means;
    whereby a controlling passenger may further actively modify the activation signal sent to selected constraint means thus affecting the inflation speed, pattern and volume of selected constraint means' air bags.

* * * * *